US010604324B2

(12) United States Patent
Berbert et al.

(10) Patent No.: US 10,604,324 B2
(45) Date of Patent: Mar. 31, 2020

(54) MULTILAYER ADHESIVE ABSORBENT LAMINATE

(71) Applicant: BEMIS COMPANY, INC., Neenah, WI (US)

(72) Inventors: Otacilio T. Berbert, Oshkosh, WI (US); Bruce D. Kehler, Neenah, WI (US); Shayne D. Spence, Cuyahoga Falls, OH (US); Gary A. McMaster, Stow, OH (US)

(73) Assignee: Bemis Company, Inc., Neenah, WI (US)

( * ) Notice: Subject to any disclaimer, the term of this patent is extended or adjusted under 35 U.S.C. 154(b) by 674 days.

(21) Appl. No.: 14/773,450

(22) PCT Filed: Mar. 14, 2013

(86) PCT No.: PCT/US2013/031490
§ 371 (c)(1),
(2) Date: Sep. 8, 2015

(87) PCT Pub. No.: WO2014/142896
PCT Pub. Date: Sep. 18, 2014

(65) Prior Publication Data
US 2016/0016718 A1 Jan. 21, 2016

(51) Int. Cl.
B65D 81/26 (2006.01)
B65D 65/40 (2006.01)
B65D 81/34 (2006.01)
C09J 7/21 (2018.01)
C09J 7/38 (2018.01)
B32B 5/02 (2006.01)
B32B 25/14 (2006.01)
B32B 25/16 (2006.01)
B32B 27/10 (2006.01)
B32B 27/12 (2006.01)
B32B 27/30 (2006.01)
B32B 27/32 (2006.01)
B32B 27/34 (2006.01)
B32B 27/36 (2006.01)
B32B 29/00 (2006.01)
B65D 65/14 (2006.01)
C09J 153/02 (2006.01)

(52) U.S. Cl.
CPC ............ B65D 81/264 (2013.01); B32B 5/022 (2013.01); B32B 25/14 (2013.01); B32B 25/16 (2013.01); B32B 27/10 (2013.01); B32B 27/12 (2013.01); B32B 27/308 (2013.01); B32B 27/32 (2013.01); B32B 27/34 (2013.01); B32B 27/36 (2013.01); B32B 29/002 (2013.01); B65D 65/14 (2013.01); B65D 65/40 (2013.01); B65D 81/3461 (2013.01); C09J 7/21 (2018.01); C09J 7/38 (2018.01); C09J 153/02 (2013.01); B32B 2307/31 (2013.01); B32B 2307/514 (2013.01); B32B 2307/718 (2013.01); B32B 2307/726 (2013.01); B32B 2405/00 (2013.01); B32B 2439/70 (2013.01); B65D 2581/3405 (2013.01); B65D 2581/3455 (2013.01)

(58) Field of Classification Search
None
See application file for complete search history.

(56) References Cited

U.S. PATENT DOCUMENTS

| 4,865,854 | A | | 9/1989 | Larson | |
|---|---|---|---|---|---|
| 4,935,276 | A | * | 6/1990 | Pawlowski | B65D 81/264 426/107 |
| 5,124,519 | A | * | 6/1992 | Roy | A21B 3/131 219/730 |
| 5,552,169 | A | * | 9/1996 | Kannankeril | B65D 81/264 206/204 |
| 5,667,863 | A | | 9/1997 | Cullen et al. | |
| 5,698,317 | A | | 12/1997 | Kurokawa et al. | |
| 5,776,842 | A | | 7/1998 | Wood et al. | |
| 6,808,776 | B2 | * | 10/2004 | Mientus | B32B 27/06 428/200 |
| 7,081,498 | B2 | * | 7/2006 | Moeller | C09J 153/02 525/89 |
| 7,141,770 | B2 | | 11/2006 | Zafiroglu et al. | |
| 7,387,205 | B1 | | 6/2008 | Wilson | |
| 7,771,812 | B2 | | 8/2010 | Beu et al. | |
| 8,252,425 | B2 | | 8/2012 | Lee et al. | |
| 2004/0023000 | A1 | * | 2/2004 | Young | B65D 81/264 428/138 |
| 2005/0118916 | A1 | * | 6/2005 | Ducker | A61F 13/15203 442/385 |
| 2005/0170123 | A1 | * | 8/2005 | Zielske | C09J 7/20 428/40.1 |
| 2005/0208243 | A1 | * | 9/2005 | Chambers | B32B 5/26 428/36.1 |
| 2006/0229411 | A1 | * | 10/2006 | Hatfield | C09J 153/02 525/88 |
| 2008/0019957 | A1 | | 1/2008 | Neudecker et al. | |
| 2008/0145611 | A1 | * | 6/2008 | Mess | G09F 3/0291 428/143 |
| 2011/0281486 | A1 | | 11/2011 | Baciu et al. | |
| 2012/0012578 | A1 | | 1/2012 | Hach | |
| 2012/0114808 | A1 | * | 5/2012 | Cichowski | B65D 75/366 426/113 |
| 2015/0150286 | A1 | * | 6/2015 | Milligan | D04H 1/488 428/40.1 |

FOREIGN PATENT DOCUMENTS

| EP | 0617686 B1 | 8/1995 |
|---|---|---|
| WO | 2004059060 A1 | 7/2004 |

(Continued)

OTHER PUBLICATIONS

Definition "Paper" from Dictionary.com, retrived Mar. 15, 2018.*

(Continued)

Primary Examiner — Anish P Desai
(74) Attorney, Agent, or Firm — Amy L. De Coster

(57) ABSTRACT

The present invention provides multilayer absorbent laminates useful for absorbing undesired liquids released from packaged food products during storage, display, or heating, including microwave cooking. In one aspect, the present invention provides a multilayer absorbent laminate comprising a first layer comprising an absorbent material, a second layer comprising a polymeric bonding material, a third layer comprising a polymeric support film layer, and a fourth layer comprising an adhesive.

17 Claims, 2 Drawing Sheets

(56) References Cited

FOREIGN PATENT DOCUMENTS

| WO | 2011067305 A1 | 6/2011 | |
|---|---|---|---|
| WO | WO 2011067305 A1 * | 6/2011 | ............... B32B 5/18 |
| WO | 2012064862 A2 | 5/2012 | |

OTHER PUBLICATIONS

Definition "film" from Merriam-Webster dictionary, retrived Mar. 16, 2018.*
Definition "cellophane" from Merriam-Webster dictionary, retrived Mar. 16, 2018.*
Ahlstrom Corporation Technical Data Sheet 18004, Aug. 2, 2005.
BASF The Chemical Company Technical Information Sheet, "Adhesive Raw Materials", Jul. 2008.

* cited by examiner

MULTILAYER ADHESIVE ABSORBENT LAMINATE

FIELD OF THE INVENTION

The present invention relates to multilayer adhesive absorbent laminates.

BACKGROUND OF THE INVENTION

Maintaining freshness of packaged food is increasingly important since packaging, distribution and point of sale locations are increasingly more distant. Also, as convenience foods become more prevalent, microwaveable food packaging that enhances the flavor and texture of the food being heated is highly desirable. Controlling the undesired liquids that form within a food package during storage, display or heating of foods can play an important role by improving safety and shelf life of foods as well as enhancing aesthetics and controlling sogginess.

Absorbent food pads and films are described, for example, in US Patent Application Publication Nos. 2008/0199577 and US2012/0114808, and U.S. Pat. Nos. 7,771,812 and 7,141,770. Food pads are often utilized to absorb excess liquids from meat or seafood that is packaged for display and fresh sale and are also used to absorb moisture and fats from frozen or fresh foods that are packaged for in-package preparation such as bacon or breakfast sandwiches.

Traditional food pads and absorbent food packages can be costly to produce and even inconvenient for assembly of the packaging system. In addition, rising food costs and commoditization of the food packaging industry has applied pressure to food and food package manufacturers to achieve the desired packaging properties with increased flexibility in manufacturing and at a reduced cost. Therefore, there is still a need for absorbent materials that can provide good liquid absorption yet are inexpensive and do not require non-traditional packaging and labeling equipment for their use.

SUMMARY OF THE INVENTION

In one aspect, the present invention provides a multilayer adhesive absorbent structure comprising a first layer comprising an absorbent material, a second layer comprising a polymeric bonding material, a third layer comprising a polymeric support film layer, and a fourth layer comprising an adhesive.

In another aspect, the present invention provides a multilayer adhesive absorbent structure comprising an absorbent material having an absorption capacity of at least about 400%, one surface comprising essentially of cellulose and an opposing second surface comprising essentially of synthetic fibers, a second layer comprising a polymeric bonding layer, a third layer comprising an oriented polymeric support film layer, and a fourth layer comprising a synthetic rubber-based adhesive.

DETAILED DESCRIPTION OF THE INVENTION

Figure 1:
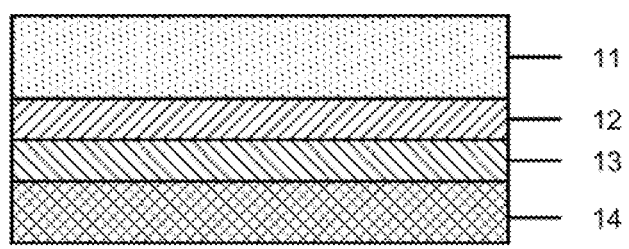
FIG. 1 is a cross sectional view of one embodiment of a multilayer absorbent label of the present invention.

The present invention provides multilayer absorbent labels useful for absorbing undesired liquids released from packaged food products during storage, display, or heating, including microwave cooking. The labels of the present invention are in essence universal, such that they can be used in virtually any existing food packaging system intended for food storage, display and heating.

As used herein, the term "polymer" refers to a macromolecule composed of repeating structural units and includes homopolymers, copolymers and heteropolymers. Therefore, as used herein, polymeric materials can comprise polymers, copolymers, or mixtures thereof.

As used herein, the term "layer" refers to a discrete film or sheet component that is coextensive with the film or sheet and has substantially uniform composition. Thus, in a monolayer film, the terms "film," "sheet" and "layer" are synonymous.

As used herein, the term "multilayer" means a plurality of layers in a single film structure generally in the form of a sheet or web which can be made from polymeric or non-polymeric materials bound together by conventional means known in the art, for example, lamination, co-extrusion and the like.

As used herein, the term "hot melt" refers to an adhesive which are solvent-free, thermoplastic materials that are mixed and applied in the molten state at temperatures varying from 65° to 220° C. and more typically from 120° to 180° C. Hot-melt adhesives may be composed of at least three main components: a high molecular weight polymer (e.g., but not limited to, EVA or synthetic rubber), which acts as a backbone and provides the primary mechanical properties of the adhesive; a tackifying resin, which provides wetting and adhesion properties; and a plasticizer, such as an oil or wax, which controls the viscosity of the blend and enables the adhesive to be handled by simple machinery.

The adhesive absorbent laminates in accordance with the present invention can be used in a variety of food packaging and storage containers. In one embodiment, the laminates can be supplied as a web that the consumer can further remove the label from and place the label within a food storage or preparation container such as a plastic, plastic composite, rubber, aluminum, glass, or stainless steel container. In another embodiment, the laminates are incorporated into or supplied with a food packaging system. Such systems can include those used for temporarily storing fresh foods such as meats and seafood for display and sale, as well as microwaveable food packaging systems. In one embodiment, the food packaging system is a system for facilitating the cooking of food that exudes oil, grease, fat and the like during the cooking process such as bacon, sausage, or fried chicken. In another embodiment, the food packaging system is a system for facilitating the cooking of food that releases moisture, including steam, during the cooking process such as a frozen breakfast sandwich, lunch or snack sandwich, or other food item. In certain embodiments, the multilayer adhesive absorbent structure can be adhered to the inside of the packaging system prior to sealing the package, typically by the food packager. In other embodiments, the structure can be adhered to the inside of the package by the consumer after opening the package but prior to microwaving the food product.

In certain embodiments of the present invention, one or more adhesive absorbent laminates are adhered to the interior of a food package. Such food packaging can be any packaging format including pouches, flow-wrap, horizontal form fill seal (HFFS), vertical form fill seal (VFFS), gas-flushed, vacuum-packaged, sealed rigid plastic containers and the like. In one embodiment, the absorbent layer of the laminate is in contact with the food item in the package.

Referring to FIG. 1, the multilayer adhesive absorbent laminate 10 has an absorbent layer 11, a polymeric bonding layer 12, a polymeric support film layer 13, and an adhesive layer 14.

Figure 2:
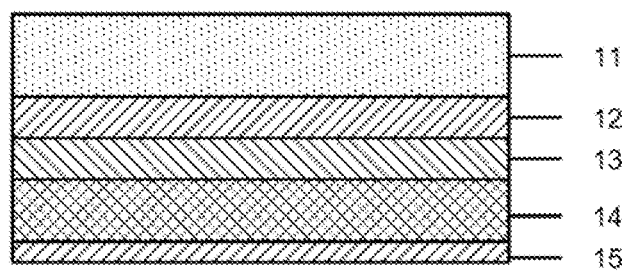
FIG. 2 is a cross sectional view of one embodiment of a multilayer absorbent label of the present invention.

Referring to FIG. 2, the multilayer adhesive absorbent laminate 10 has an absorbent layer 11, a polymeric bonding layer 12, a polymeric support film layer 13, and an adhesive layer 14, and a liner layer 15.

Absorbent layer 11 is capable of absorbing water, grease (or fats and oils), or other undesired liquids that are released by packaged food products during storage, display or heating. In a preferred embodiment, absorbent layer 11 is capable of absorbing both water and grease or the like exuded from a food item. The absorbent layer 11 can comprise one or more absorbing elements such as cellulose, synthetic fibers, paper-based materials, non-woven fabrics and polymeric materials, or combinations thereof. In one embodiment, the absorbent layer comprises a non-woven fabric of cellulosic and synthetic fibers. In one embodiment, absorbent layer 11 may include two or more layers, such as, for example, an inner-facing paper or cellulose fiber layer and a polypropylene fiber layer.

While not wishing to be bound by any particular theory, it is believed that absorbent materials having non-woven paper, cellulosic or regenerated cellulosic fiber and non-woven polypropylene or any other synthetic polyolefin fiber facilitates the absorption of both water and grease. In a preferred embodiment, the absorbent layer 11 comprises a non-woven fabric of cellulosic and synthetic fibers having a basis weight (or density) greater than about 24 grams per square meters, and more preferably, at least about 54 grams per square meters. In another preferred embodiment, the absorbent layer comprises a non-woven fabric of cellulosic and synthetic fibers having a wet tensile strength in the transverse direction (cross direction) of greater than about 400 grams per 25 millimeters, more preferably, greater than about 1000 grams per 25 millimeters, and most preferably, at least about 1450 grams per 25 millimeters. In another preferred embodiment, the absorbent layer comprises a non-woven fabric of cellulosic and synthetic fibers having a wet tensile strength in the machine direction of greater about 1000 grams per 25 millimeters, more preferably, greater than about 2000 grams per 25 millimeters, and most preferably, at least about 2600 grams per 25 millimeters. In one embodiment, absorbent layer 11 may include two or more layers, such as, for example, an inner-facing paper-based layer and an opposing polypropylene fiber layer. In a preferred embodiment, absorbent layer 11 has a water absorption capacity of at least about 400%, more preferably, at least about 500%, and most preferably, about 520%. Such absorbent materials are commercially available, for example, AHLSTROM 18004 and AHLSTROM 18005 from Ahlstrom Corporation, Helsinki, Finland. As depicted in FIG. 1, absorbent layer 11 may serve to absorb moisture and/or grease released from food item (not shown) during heating (e.g., exposure to microwave energy) of food item. As such, laminate 10 acts to control the moisture content of food item, the appearance of the food item and prevent food item 11 from becoming too soggy due to excessive moisture.

In one embodiment, polymeric bonding layer 12 comprises a non-oriented polyolefin, preferably non-oriented polyethylene and more preferable non-oriented low density polyethylene. As depicted in FIGS. 1 and 2, polymeric bonding layer 12 is positioned between the absorbent layer 11 and polymeric support film layer 13 which serves to bond the absorbent layer to the support layer. In a preferred embodiment, the non-oriented low density polyethylene has a melt index of at least about 3.0 grams per 10 minutes, and more preferably, at least about 3.7 grams per 10 minutes. In a preferred embodiment, the non-oriented low density polyethylene has a density of less than about 1.0 grams per cubic centimeter, and more preferably, about 0.92 grams per cubic centimeter. Commercially available of such low density include LyondellBasell® PETROTHENE NA 216-000 produced by Equistar Chemical Company, Houston, Tex.

Polymeric support film layer 13 is used to support absorbent layer 11 and adhesive layer 14. In one embodiment, polymeric support film layer 13 comprises an oriented film. In a preferred embodiment, polymeric support film layer 13 has a thickness of between about 44 gauge and about 48 gauge (about 11 micron and about 12 micron). In a preferred embodiment, polymeric support film layer 13 is polyethylene terephthalate. In a more preferred embodiment, polymeric support film layer 13 is an oriented film of polyethylene terephthalate (OPET). In another preferred embodiment, polymeric support film layer 13 is polypropylene. In another more preferred embodiment, polymeric support film layer 13 is an oriented film of polypropylene (OPP). In another preferred embodiment, polymeric support film layer 13 is polyamide (nylon). In another more preferred embodiment, polymeric support film layer 13 is an oriented film of polyamide (nylon). In still another preferred embodiment, polymeric support film layer 13 is an oriented film of cast polyamide (nylon). Commercially available oriented polyethylene terephthalate include a 48 gauge Skyrol® SP65 produced by SKC Co., Ltd., Seoul, South Korea. In one preferred embodiment, polymeric support film layer 13 is coated with an aqueous primer to assist with bonding to bonding polymeric layer 12. Commercially available primers include Aquafortee 108-W produced by Aqua Based Technologies, Northvale, N.J.

Those skilled in the art will appreciate that the use of such plastics as polyethylene terephthalate, polypropylene and polyamide as support films is desirable because of their durability, flexibility and resistance to heat, moisture and solvents compared to non-plastics such as paper or cellulose-based substrates. However, some of the same properties that make these plastics attractive as support films also make them difficult to bond with adhesives because they have low surface energy rendering them "non-stick" (like Teflon®). Surface energy is important because it influences the ability of adhesives to adequately wet plastic surfaces and create strong adhesive bonds. It is well recognized in the art that adhesive problems often occur with plastics that possess low surface energies such as those described above.

Adhesive layer 14 is used for attaching the multilayer laminates of the present invention to the interior of the food package. The adhesives in accordance with the present invention are adhesives that are generally recognized as safe for use in food packaging. Adhesive layer 14 must provide adequate adhesive between the surface of support layer 13 and the surface of the package. In other words, adhesive layer 14 must be capable of spreading (or "wetting") over the surfaces of support layer 13 and the package. Therefore, adhesive layer 14 must be compatible with low surface energy plastics. Those skilled in the art will appreciate that not only does the chemical make-up of the adhesive and plastics affect adhesion, but so will any contamination present on these surfaces. For example, the release of water and grease or oils from a food item during heating of the food item can change the surface energy of the plastic. Water and/or grease can also be absorbed by the adhesive or react with the adhesive components which may then affect the chemical nature of the adhesive. An adhesive which may be compatible with grease and oils, e.g., non-reactive or non-absorptive, may otherwise react with or absorb water. In addition, heat generated during the heating cycle in a microwave oven can also accelerate chemical changes within the adhesive. Changes to the surface energy and chemical nature of the adhesive can subsequently degrade the strength of the adhesive bonds. Therefore, adhesive layer 14 must be tolerant of water and compatible with grease.

In one embodiment, the adhesive 14 is an adhesive tolerant of water and compatible with grease. In a preferred embodiment, adhesive 14 is a synthetic rubber-based adhesive compatible with both water and grease. In a further embodiment, adhesive 14 is a hot-melt synthetic rubber-based adhesive compatible with both water and grease. Specific examples of suitable hot melt synthetic rubber-based adhesives tolerant of water and compatible with grease include blends of styrene-isoprene (SI) block copolymer and styrene-butadiene (SB) block copolymer as described in U.S. Pat. No. 7,081,498 which is incorporated herein by reference. In a preferred embodiment, adhesive 14 comprises a composition of about 10 to about 40% of a styrene-isoprene (SI) block copolymer, about 5 to about 30% of a styrene-butadiene (SB) block copolymer, about 30 to about 65% of an aromatically modified tackifying resin, about 8 to about 30% of a plasticizing oil, wherein the percentages are based on the total weight of the composition. In these compositions, the styrene-isoprene block copolymer has a styrene content of from about 14% to about 30% by weight. Other examples of suitable hot-melt synthetic rubber-based adhesives tolerant of water and compatible with grease include blends of styrene-isoprene-styrene (SIS) block copolymer and styrene-butadiene-styrene (SBS) block copolymer. In a preferred embodiment, adhesive 14 is a blend of styrene-isoprene-styrene polymer and styrene-butadiene copolymer having a glass transition temperature (T) of at least about −5° C., more preferably, between about 0° and about 10° C. Commercially available free-standing films of such as hot melt synthetic rubber-based adhesives are IF1061DL and IF1092A produced by Morgan Adhesives Company, Stow, Ohio.

In an alternative embodiment, adhesive 14 is a water-based acrylic emulsion adhesive tolerant of both water and grease. In one embodiment, the water-based acrylic emulsion adhesive includes 2 ethylhexyl acrylate-vinyl acetate-styrene-acrylic acid copolymer having a glass transition temperature ($T_g$) of between about −40° C. and about −10° C., preferably between about −17° C. and about −10° C. Such water-based acrylic emulsion adhesives may include 2-ethyhexyl acrylate-vinyl acetate-styrene-acrylic acid copolymer and further include defoamer. A commercially available example is Flexcryl™ LC-18 produced by Ashland Chemical Company, Columbus, Ohio.

Liner layer 15 can be any material suitable for releasing adhesive layer 14 from the liner, and will depend primarily on the type of adhesive employed. The liner layer is laminated to the remaining layers of the laminate by the adhesive layer. In certain embodiments, the liner layer 15 is removable. Such liner layer can be removed to expose the adhesive layer to facilitate adherence of the laminate to a food package. Adhesive/liner combinations are generally known to those skilled in the art. The multilayer absorbent label 10 of the present disclosure may shaped to fit within any food item receiving space and may include such shapes as circles, squares, rectangles, ovals, polygons, trapezoids, triangles, or any combinations thereof.

It will be appreciated that absorbent laminate 10 in accordance with the present invention can be used in a variety of food packaging and storage containers. In one embodiment, the laminate 10 can be supplied as a web that the consumer can further remove the label from and place the label within a food storage or preparation container such as a plastic, plastic composite, rubber, aluminum, glass, or stainless steel container. In another embodiment, the laminate 10 can be incorporated into or supplied with a food packaging system. Such systems can include those used for temporarily storing fresh foods such as meats and seafood for display and sale, as well as microwaveable food packaging systems. In certain embodiments, laminate 10 can be adhered to the inside of the packaging system prior to sealing the package, typically by the food packager. In other embodiments, laminate 10 can be adhered to the inside of the package by the consumer after opening the package but prior to microwaving the food product.

Figure 3:
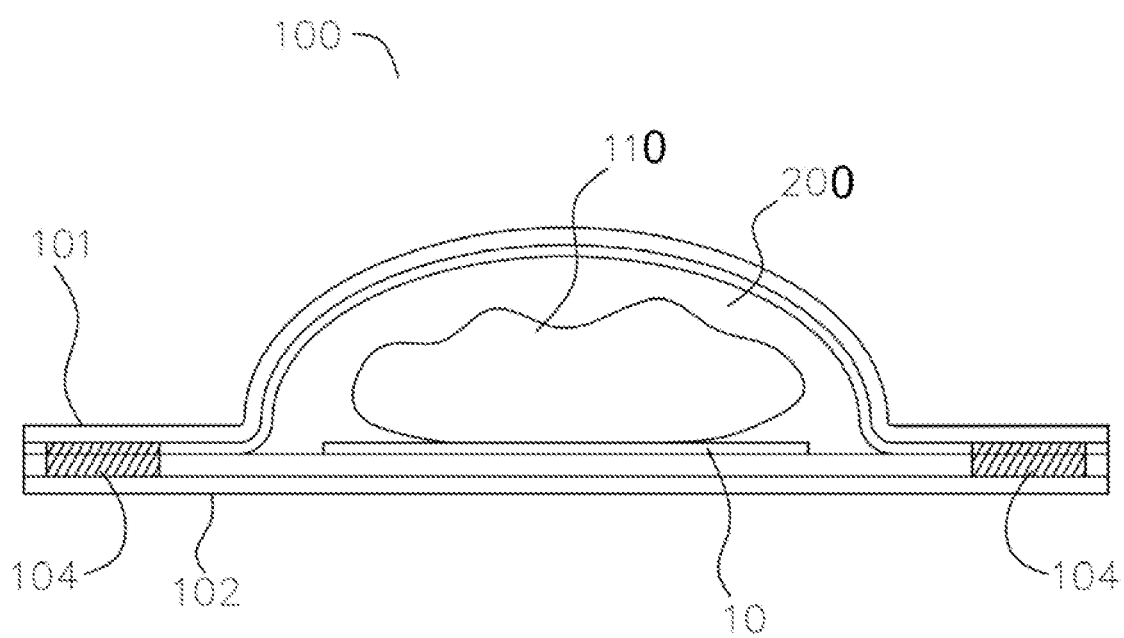
FIG. 3 is a cross sectional view of one embodiment of a food packaging system of the present invention.

Referring to FIG. 3, a sealed food package 100 is shown according to an exemplary embodiment. Food package 100 is suitable to contain any of a variety of food products, such as including a bread product and a meat product including, but not limited to, breakfast items such as breakfast sandwiches, lunch items such as lunch sandwiches, etc., dinner items, snack items, and the like. As shown in FIG. 3, sealed food package 100 includes a food item 110 provided within the interior of container 200. Food item 110 may naturally contain moisture and/or solid grease that is released when food item 110 is heated as a result of undergoing a cooking process (e.g., microwave cooking, etc.). In this embodiment, absorbent layer 11 of laminate 10 is in contact with the food item 110 in the package 100. In certain other embodiment, absorbent laminate 10 may not be in contact with the food item 110.

According to one embodiment, food package 100 includes a first thermoplastic film 101 and a second thermoplastic film 102. First thermoplastic film 101 is configured to define a food item receiving space 200 (e.g., a pocket, receptacle, formed portion, etc.) It will be appreciated that food item receiving space 200 may be configured to provide a space or gap (e.g., "a steam dome") about food item 110 when food item 110 is heated in a microwave oven. Second thermoplastic film 102 is affixed to first thermoplastic film 101 by the formation of a heat-seal 104 which circumscribes food item receiving space 200 which includes joining first film 101 to second film 102. It will be appreciated by those skilled in the art that heat-seal 104 provides a barrier to microorganisms and prevents ingress of oxygen, moisture, humidity, and any outside contaminant into the sealed package which can degrade the food item container inside package 100. In this particular embodiment, label 10 adhered to the second thermoplastic film 102.

EXAMPLES

Example 1

Multilayer adhesive absorbent laminate is prepared by extrusion laminating a low density polyethylene (LDPE) bonding layer between a water based primer coated surface of an oriented polyethylene terephthalate (OPET) support film of approximately 44 to 48 gauge and the predominately cellulosic surface of an absorbing paper layer (Ahlstrom 18004 provided by Ahlstrom Corporation of Helsinki, Finland). A hot melt synthetic rubber-based adhesive of styrene-isoprene-styrene and styrene-butadiene-styrene (IF1092A Morgan Adhesive Company, Stow, Ohio) is coated onto the surface of a silicone treated release liner to a thickness of about 1.0 mil (about 25.4 micron). The absorbent paper/LDPE/OPET combination is then laminated to the PSA/liner combination at room temperature under pressure of between 5 to 100 psi to form a laminate having the structure: absorbent paper/LDPE/OPET/PSA/liner.

Example 2

Multilayer adhesive absorbent laminate is prepared with the same material and method as described above for Example 1, except for the PSA adhesive is an water-based acrylic emulsion adhesive (Flexcryl™ LC-18 produced by Ashland Chemical Company, Columbus, Ohio) with defoamer added. After coating the PSA, the PSA/liner combination is dried by passing it through a drying oven.

Example 3

Multilayer adhesive absorbent laminate is prepared with the same material and method as described above for Example 1, except for the PSA adhesive is UV curable acrylic adhesive (acResin® A260 UV produced by BASF Corporation, Charlotte, N.C.).

Example 4

Multilayer adhesive absorbent laminate is prepared with the same material and method as described above for Example 1, except for the adhesive is a hot melt synthetic rubber-based adhesive of a blend of about 10 to about 40% of a styrene-isoprene block copolymer, about 5 to about 30% of a styrene-butadiene block copolymer, about 30 to about 65% of an aromatically modified tackifying resin, about 8 to about 30% of a plasticizing oil (IF1061DL Morgan Adhesive Company, Stow, Ohio).

The examples were tested by cutting circular specimens of about 4% inch in diameter, removing the liner layer and adhering the adhesive surface to the surface of a packaging film inside the heat seal area as depicted FIG. 3. After placing the adhesive absorbent laminate inside the package, a Biscuit-type or Croissant-type of breakfast sandwich was placed on the laminate and the package heat-sealed. The package and its contents were heated (cooked) in a standard microwave oven using two different cook times to simulate a "normal" (1 minute:45 second) and "aggressive" (2 minute:30 second) conditions. Results are described in Table I below.

TABLE 1

Microwave Testing of Adhesive Absorbent Laminates

| Sample | Sandwich Type | Cook Time (min:sec) | Observations |
| --- | --- | --- | --- |
| Example 1-A | Biscuit | 1:45 | No adhesive creep; strong post-cook adhesive bond |
| Example 1-B | Biscuit | 2:30 | No adhesive creep; strong post-cook adhesive bond |
| Example 1-C | Croissant | 1:45 | No adhesive creep; strong post-cook adhesive bond |
| Example 1-D | Croissant | 2:30 | No adhesive creep; strong post-cook adhesive bond |

TABLE 1-continued

Microwave Testing of Adhesive Absorbent Laminates

| Sample | Sandwich Type | Cook Time (min:sec) | Observations |
| --- | --- | --- | --- |
| Example 2-A | Biscuit | 1:45 | No adhesive creep; reasonable post-cook adhesive bond |
| Exarriple 2-B | Biscuit | 2:30 | No adhesive creep; strong post-cook adhesive bond |
| Example 2-C | Croissant | 1:45 | No adhesive creep: reasonable post-cook adhesive bond |
| Example 2-D | Croissant | 2:30 | No adhesive creep; reasonable post-cook adhesive bond |
| Example 3-A | Biscuit | 1:45 | No adhesive creep: reasonable post-cook adhesive bond |
| Example 3-B | Biscuit | 2:30 | No adhesive creep; reasonable post-cook adhesive bond |
| Example 3-C | Croissant | 1:45 | No adhesive creep; reasonable post-cook adhesive bond |
| Example 3-D | Croissant | 2:30 | No adhesive creep; weak post-cook adhesive bond |
| Example 4-A | Biscuit | 1:45 | No adhesive creep; strong post-cook adhesive bond |
| Example 4-B | Biscuit | 2:30 | No adhesive creep: strong post-cook adhesive bond |
| Example 4-C | Croissant | 1:45 | No adhesive creep; reasonable post-cook adhesive bond |
| Example 4-D | Croissant | 2:30 | No adhesive creep: strong post-cook adhesive bond |

There was no visible adhesive creep or ooze observed for any of the samples after duration of the cook time. After cooking, the packages were opened and the leading edge of each label was gently picked to see if the label could be removed from the packaging film without use of excessive force. In the samples indicated as having a strong post-cook adhesive bond, the label could not be separated from the packaging film without destructing the adhesive layer. For those samples indicated as having a reasonable post-cook adhesive bond, the laminate could be at least partially peeled off the packaging film without destructing the adhesive layer. With the sample having a weak post-cook adhesive bond, the laminate could be completely removed from the packaging film without any force applied to it. Without being bound by any particular theory, it is believed that strong and reasonable post-cook adhesive bonds generally correlate to an ability of the adhesive to be compatible with or at least tolerant of water and grease without affecting its adhesive strength.

The invention claimed is:

1. A multilayer adhesive absorbent laminate comprising:
   a. a first layer comprising an absorbent material having a water absorption capacity of at least 400%;
   b. a second layer comprising a polymeric bonding material comprising a non-oriented polyolefin;
   c. a third layer comprising a polymeric support film;
   d. a fourth layer comprising an adhesive comprising a synthetic rubber-based adhesive; and
   e. a fifth layer comprising a liner;
   wherein said second layer is in direct contact with said first layer and said third layer, and said third layer is in direct contact with said second layer and said fourth layer, and said fifth layer is in direct contact with said fourth layer; and
   wherein the fifth layer is releasably removable from the fourth layer.

2. The laminate of claim 1, wherein said absorbent material is a non-woven cellulose or paper-based material, and a non-woven polyolefin material.

3. The laminate of claim 1, wherein said absorbent material is a non-woven material having a first surface and an opposing second surface, wherein the first surface forms an outer surface of said first layer, wherein the first surface comprising essentially of cellulose or paper-based material and the second surface comprising essentially of polypropylene.

4. The laminate of claim 1, wherein said absorbent material has a water absorption capacity of at least 500%.

5. The laminate of claim 1, wherein said absorbent material has a basis weight of at least 54 grams per square meter.

6. The laminate of claim 1, wherein said absorbent material has a wet tensile strength in the transverse direction of at least 1450 grams per 25 millimeters.

7. The laminate of claim 1, wherein said non-oriented polyolefin is non-oriented polyethylene.

8. The laminate of claim 1, wherein said non-oriented polyolefin is non-oriented low density polyethylene.

9. The laminate of claim 1, wherein said polymeric support film layer is an oriented film.

10. The laminate of claim 1, wherein said polymeric support film layer is an oriented film of polyethylene terephthalate, polypropylene or polyamide.

11. The laminate of claim 1, wherein said adhesive is a hot melt synthetic rubber-based adhesive.

12. The laminate of claim 1, wherein said adhesive is a hot melt synthetic rubber-based adhesive having a glass transition temperature of at least −5° C.

13. The laminate of claim 1, wherein said adhesive is a hot melt synthetic rubber-based adhesive comprising a blend of from 10% to 40% of a styrene-isoprene (SI) block copolymer, of from 5% to 30% of a styrene-butadiene (SB) block copolymer, wherein said percentages are based on the total weight of the composition.

14. The laminate of claim 1, wherein said adhesive is a hot melt synthetic rubber-based adhesive comprising of from 10% to 40% of a styrene-isoprene block copolymer, of from 5% to 30% of a styrene-butadiene block copolymer, of from 30% to 65% of an aromatically modified tackifying resin, of from 8% to 30% of a plasticizing oil, wherein said percentages are based on the total weight of the composition.

15. The laminate of claim 1, wherein said adhesive is a hot melt synthetic rubber-based adhesive comprising of from 10% to 40% of a styrene-isoprene block copolymer, of from 5% to 30% of a styrene-butadiene block copolymer, of from 30% to 65% of an aromatically modified tackifying resin, and of from 8% to 30% of a plasticizing oil, wherein said percentages are based on the total weight of the composition and wherein said styrene-isoprene block copolymer has a styrene content of from 14% to 30% by weight of the styrene-isoprene block copolymer.

16. The laminate of claim 1, wherein said adhesive is a hot melt synthetic rubber-based adhesive comprising a blend of styrene-isoprene-styrene block copolymer and styrene-butadiene-styrene block copolymer.

17. The laminate of claim 1, wherein said adhesive is a water-based acrylic emulsion adhesives and comprising 2-ethylhexyl acrylate-vinyl acetate-styrene-acrylic acid copolymer and defoamer.

* * * * *

UNITED STATES PATENT AND TRADEMARK OFFICE
CERTIFICATE OF CORRECTION

| | | |
|---|---|---|
| PATENT NO. | : 10,604,324 B2 | Page 1 of 1 |
| APPLICATION NO. | : 14/773450 | |
| DATED | : March 31, 2020 | |
| INVENTOR(S) | : Otacilio T. Berbert et al. | |

It is certified that error appears in the above-identified patent and that said Letters Patent is hereby corrected as shown below:

In the Specification

Column 4, Line 38, replace "Aquafortee" with -- Aquaforte® --

Column 5, Line 40, replace "(T)" with -- Tg --

Column 5, Line 54, replace "ethyhexyl" with -- ethylhexyl --

Column 7, Line 42, replace "4%" with -- 4 ¼ --

Signed and Sealed this
Eighth Day of February, 2022

Drew Hirshfeld
*Performing the Functions and Duties of the*
*Under Secretary of Commerce for Intellectual Property and*
*Director of the United States Patent and Trademark Office*